(12) United States Patent
Hamlet

(10) Patent No.: US 10,706,181 B1
(45) Date of Patent: Jul. 7, 2020

(54) RANDOMIZATION OF DANGLING NODES IN A DIGITAL CIRCUIT DESIGN TO MITIGATE HARDWARE TROJANS

(71) Applicant: National Technology & Engineering Solutions of Sandia, LLC, Albuquerque, NM (US)

(72) Inventor: Jason Hamlet, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 182 days.

(21) Appl. No.: 15/846,571

(22) Filed: Dec. 19, 2017

(51) Int. Cl.
 G06F 21/00 (2013.01)
 G06F 21/85 (2013.01)
 G06F 30/327 (2020.01)

(52) U.S. Cl.
 CPC ............ G06F 21/85 (2013.01); G06F 30/327 (2020.01)

(58) Field of Classification Search
 CPC ...... G06F 21/85; G06F 17/505; G06F 21/577; G06F 21/568; G06F 30/327; G06F 21/566; G06L 21/85
 See application file for complete search history.

(56) References Cited

U.S. PATENT DOCUMENTS

| | | | |
|---|---|---|---|
| 6,086,626 A * | 7/2000 | Jain | G01R 31/318357 716/103 |
| 9,218,506 B2 | 12/2015 | Tehranipoor et al. | |
| 9,311,481 B1 | 4/2016 | Wawda et al. | |
| 9,325,493 B2 | 4/2016 | Sethumadhavan et al. | |
| 9,606,167 B2 | 3/2017 | Kung et al. | |
| 10,068,091 B1 * | 9/2018 | Aziz | G06F 21/554 |
| 10,303,878 B2 * | 5/2019 | Wu | G06F 21/568 |
| 2011/0072407 A1 | 3/2011 | Keinert et al. | |
| 2011/0126167 A1 * | 5/2011 | Plaza | G06F 17/505 716/132 |
| 2011/0185334 A1 * | 7/2011 | Iyer | G06F 17/505 716/135 |
| 2014/0283147 A1 | 9/2014 | Tehranipoor et al. | |
| 2016/0098565 A1 | 4/2016 | Vedula et al. | |
| 2017/0310688 A1 * | 10/2017 | Lecomte | G09C 1/00 |

OTHER PUBLICATIONS

Tehranipoor et al., "A Survey of Hardware Trojan Taxonomy and Detection", IEEE Design & Test of Computers, Jan./Feb. 2010, pp. 1-16, (Year: 2010).*

(Continued)

Primary Examiner — Tongoc Tran
(74) Attorney, Agent, or Firm — Madelynne J. Farber; Mark A. Dodd

(57) ABSTRACT

Described herein are various technologies pertaining to randomizing logic associated with dangling nodes in a digital circuit design. A dangling node is an input to or output from a logic gate in the digital circuit design that is identified as not impacting a desired output of the digital circuit design. Randomizing the logic associated with a dangling node can include deleting a logic gate, adding a logic gate, replacing a logic gate with another logic gate, etc. Randomizing the logic associated with the dangling node prevents hardware trojans that may have been inserted into the circuit design from being implemented in a circuit that is generated based upon the design.

19 Claims, 9 Drawing Sheets

(56) References Cited

OTHER PUBLICATIONS

Zhang et al., "VeriTrust: Verification for Hardware Trust", Chinese University of Hong Kong Reliable Computing Laboratory (CURE), in Proc. Design Automation Conference 2013. (Year: 2013).*
Zhang et al., "DeTrust: Defeating Hardware Trust Verification with Stealthy Implicity-Triggered Hardware Trojans", Chinese University of Hong Kong Reliable Computing Laboratory (CURE), CCS '14, Nov. 3-7, 2014. (Year: 2014).*
Wang et al., "Detecting Malicious Inclusions in Secure Hardware: Challenges and Solutions", IEEE Explore, Conference Paper Jul. 2008. (Year: 2008).*

* cited by examiner

RANDOMIZATION OF DANGLING NODES IN A DIGITAL CIRCUIT DESIGN TO MITIGATE HARDWARE TROJANS

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Hardware trojans have long been a concern for digital circuit designers. The trojans can be introduced in a number of ways, including through circuit designs submitted by third parties for implementation in integrated circuits (ICs) or field programmable gate arrays (FPGAs). Using third parties for portions of digital circuit design saves designers valuable time, particularly with respect to designs for Ethernet control or cryptographic cores. Essentially, instead of wasting time re-programming something that is already well-known, the designer can focus on the unique aspects of the digital circuit design and then insert the designs from the third parties where needed.

However, because the software designer has not developed the third-party design, the exact layout and design provided to the designer from the third party is unknown. In some cases, these purchased designs contain nodes outside of the path from the terminal inputs to the terminal outputs, wherein such nodes are referred to as dangling nodes. Sometimes these dangling nodes are placed purposefully to distribute heat within a circuit generated through use of the third-party design. In other situations, dangling nodes are the result of poor design, where the dangling nodes are left in the design because it is easier than removing them (since they have no impact on the functionality of the circuit). Or sometimes, the dangling nodes are intentionally placed by a malicious designer, and are designed to facilitate leakage trojans (e.g., leak sensitive data).

Detecting these hardware trojans has long been a topic of research. Existing methods of mitigating the hardware trojans include attempting to identify all trojans and removing them from the circuit, but in general there is no guarantee that all of the trojans have been found. Therefore, there is a need for an efficient, effective method for preventing inclusion of hardware trojans in ICs and/or FPGAs.

SUMMARY

The following is a brief summary of subject matter that is described in greater detail herein. This summary is not intended to be limiting as to the scope of the claims.

Described herein are various technologies pertaining to the randomization of logic associated with potential malware, such as a leakage trojan within a digital circuit. The purpose of the randomization is to reduce or nullify the damaging impact of the malware. Digital circuits are made up of a variety of logic gates that communicate to generate a desired output. Such logic gates can include AND gates, NAND gates, NOR gates, etc. The output of each logic gate is referred to herein as a node. When designing a digital circuit, a circuit designer can purchase standard, but necessary, sub-designs from third parties, such as a circuit design for an Ethernet controller. This saves the designer time and prevents him or her from having to waste energy and resources on a standard circuit sub-design that is easily obtainable. The third-party circuit sub-design can then be inserted into the overall circuit design being designed by the designer. However, because the designer did not design all of the sub-designs, the designer may not know the function of each and every node in the overall circuit design. This opens up the potential for unknown hardware trojans to permeate a circuit generated based upon the overall circuit design, and wreak havoc on the end user.

In an exemplary embodiment, potentially malicious nodes in the circuit design can be ascertained by identifying each node that does not contribute to a terminal output of the overall circuit design. These nodes are referred to as dangling nodes. So, for example, if the primary purpose of the designed circuit is to perform various mathematical functions, such as a calculator would perform, the circuit designer can isolate each node in the overall circuit design that does not work to solve the mathematical functions. These dangling nodes would then need to be augmented so as to nullify their harmful impacts. For example, the potentially harmful impacts of dangling nodes can be nullified by removing the dangling nodes from the circuit design.

Despite the seemingly straightforward nature of removing dangling nodes from the circuit design, doing so can be risky. First, it is difficult for the designer to guarantee that each dangling node has been identified. Even if a designer received a netlist from the third-party designer of all the nodes in the purchased circuit sub-design, analyzing the netlist may be difficult. This means that even if a designer removed every dangling node he was aware of, there is still a distinct possibility dangling nodes remain in the modified circuit design. In addition, removing the dangling nodes from the circuit design can have negative consequences on a circuit manufactured based upon such design. While removing the dangling nodes from the circuit will not ultimately change the primary functionality of the circuit, it can alter the way power is consumed by the circuit, decrease the operating frequency, or alter heat distribution across the circuit, which may be undesirable.

The technologies described herein pertain to identifying all dangling nodes in an overall circuit design, and, for each identified dangling node, modifying the circuit design by randomizing logic associated with the node, wherein randomizing logic associated with the node comprises randomizing logic in a fan-out cone of the node and/or randomizing logic of a logic gate having the node as an output. A fan-out cone for a node refers to the node and all nodes and logic gates from the node to terminal nodes along logic chain(s) that extend from the node. For example, and not by way of limitation, randomizing the logic can include changing a type of a gate in the fan-out cone, adding a (randomly selected) gate to the fan-out cone, placing an inverter in the fan-out cone (e.g., on the node), removing a gate from the fan-out cone, and so forth. As the logic of dangling nodes is randomized, a malicious designer who has placed hardware malware in the circuit design is thwarted, as the malicious designer is unable to predict values that can be read from dangling nodes, as the logic associated with such nodes has been randomly altered.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or

DETAILED DESCRIPTION

Figure 1:
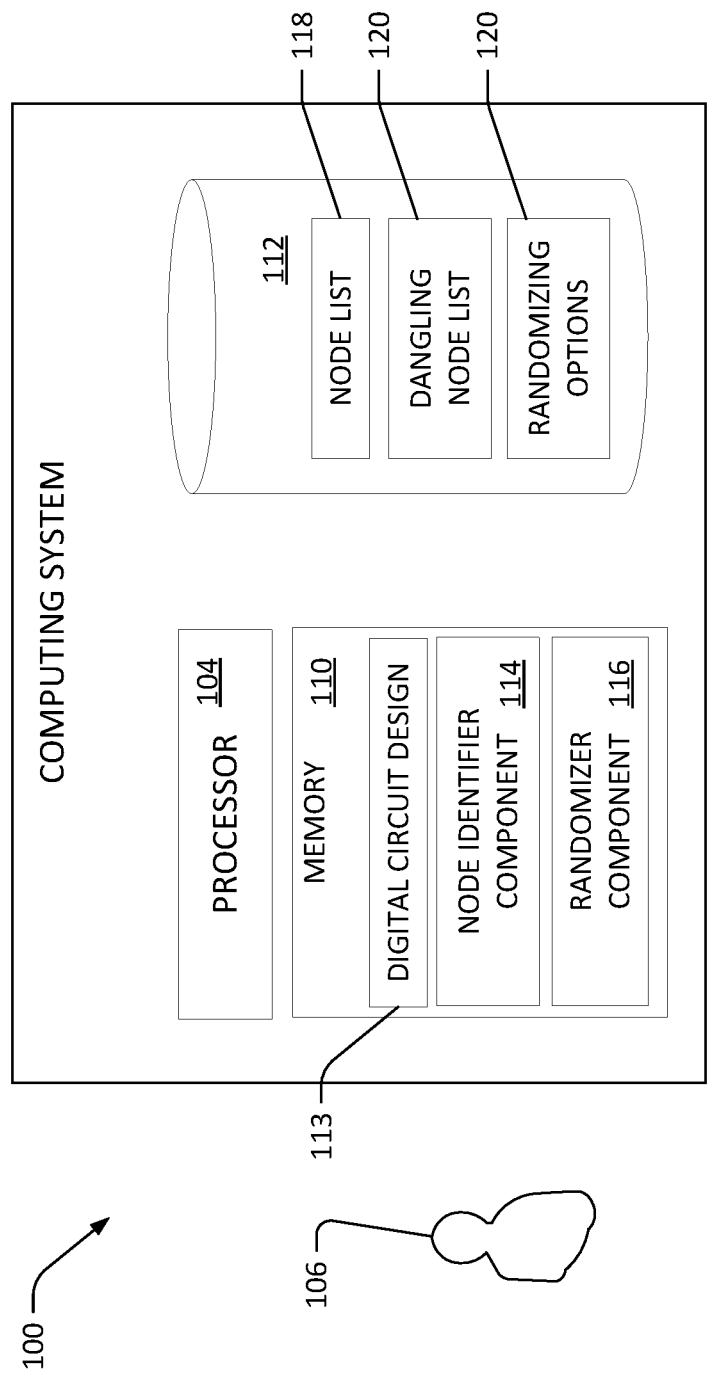
FIG. 1 is a functional block diagram of an exemplary system that facilitates the identification and randomization of logic associated with dangling nodes in a circuit design.

Various technologies pertaining to identification and randomization of logic associated with dangling nodes within a digital circuit design to reduce or nullify the potential damaging impact of malware, such as leakage trojans, in a circuit generated based upon the design are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in flow diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

Described herein are various technologies pertaining to the identification and randomization of logic in fan out-cones of dangling nodes within a digital circuit design to protect against malware, such as leakage trojans, in a circuit generated based upon the design. A digital circuit includes a plurality of logic gates, with each logic gate having at least one input and at least one output. These inputs and outputs of the logic gates in a digital circuit are referred to herein as nodes. The technology described herein relates to identifying nodes (dangling nodes) in a circuit design that fail to impact the function of a circuit from its terminal inputs to its terminal outputs, and then randomizing the logic associated with the dangling nodes to prevent any unintended consequences. As used herein, the term "terminal input" can refer to a primary input to the circuit or the output of memory in the circuit, and the term "terminal output" can refer to a primary output of the circuit or the input into memory in the circuit. Inclusion of memory input/output as being a "terminal output" or "terminal input" can be design-specific, as (for example) input/output of a flip-flop may desirably not be considered as a terminal output or terminal input, while input/output of RAM may desirably be considered a terminal output and terminal input. Contrarily, primary inputs and primary outputs can always be considered terminal inputs and terminal outputs.

Further, as used herein, a fan out cone from a node in a digital circuit design refers to all nodes and logic gates in logic chains that extend from the node to terminal output node(s). Conversely, a fan-in cone from a node refers to all nodes and logic in logic chain(s) that extend from the node to terminal input node(s). The term "node" refers to an input and/or an output to a logic gate (or other circuit element) in the digital circuit design. In an exemplary approach, a list of all nodes in the digital circuit can be generated, and nodes in the fan-in cones of the terminal output nodes of the digital circuit design are identified and substracted from the list, leaving dangling nodes. In another exemplary embodiment, fan-out cones can be generated for all nodes in the list of nodes, and all nodes with fan-out cones that include a terminal output node are removed from the list of nodes, such that only dangling nodes remain. Because these dangling nodes have no impact on the terminal output node(s), the logic functions in fan-out cones of the dangling nodes can be altered without altering the functionality of a digital circuit generated based upon the digital circuit design. Described herein, in more detail, are techniques for identifying the dangling nodes and for randomizing the logic functions in fan-out cones of the dangling nodes.

Referring now to FIG. 1, an exemplary computing system 100 is illustrated, wherein the computing system 100 is configured to identify dangling nodes in a digital circuit design and is further configured to modify the digital circuit design responsive to identifying the dangling nodes. The computing system 100 can be or include a server computing device or a plurality of server computing devices, a client computing device, which can be a desktop computing device, laptop computing device, or other suitable computing device.

The computing system 100 comprises a processor 108, memory 110, and a data store 112. The memory 110 includes a circuit design 113, a node identifier component 114, and a randomizer component 116. The circuit design 113 is a design for a digital circuit that is to be manufactured, wherein the circuit design 113 can be in the form of a netlist, a Verilog file, or other suitable computer-implemented circuit design. A digital circuit comprises several logic gates, the inputs to and outputs of which are referred to herein as nodes (e.g., a node can be an output of one gate and an input to another gate). A logic gate represents a function of Boolean logic resulting in an output of a 1 or a 0. In a digital circuit, logic gates are linked together with nodes to form a chain of logic, such that an output of a logic gate can be a function of outputs of one or more other logic gates in the chain. With respect to a node (e.g., which represents a wire in a resultant digital circuit) in the digital circuit design 113, a fan-out cone for the node includes the node and all nodes and logic gates in logic chain(s) that extend from the node to terminal output node(s) or circuit device(s) in the circuit design 113. Conversely, with respect to a node in the digital circuit design 113, a fan-in cone for the node includes the node and all nodes and logic gates in logic chain(s) that extend from the node to terminal input node(s) of the circuit design 113.

The node identifier component 114 receives the circuit design 113 and compiles a list of each node in the circuit design 113. With more particularity, the node identifier component 114 is configured to identify all nodes in the circuit design 113 by walking the logic chains in the circuit design 113 and generating a comprehensive list of nodes 118 in the circuit design 113—for example, the node identifier component 114 can "walk" all logic chains that extend from all input terminal nodes to output terminal nodes and/or can "walk" all logic chains that extend from all output terminal nodes to input terminal nodes. The node identifier component 114 causes the comprehensive list of nodes 118 to be retained in the data store 112. In connection with identifying dangling nodes in the circuit design 113, the node identifier component 114 identifies a terminal output node in the circuit design 113 (e.g., an output node whose value is desirably read to perform the function of the circuit). For example, if the circuit design 113 is for an AES encryption circuit, the node identifier component 114 can locate the node exiting a final logic gate that has an encryption value thereon. The node identifier component 114 then identifies the fan-in cone of the terminal output node by traversing back through the circuit design 113 along logic chain(s) from the terminal output node until the node identifier component 114 reaches terminal input node(s) that initiate those logic chains.

Any node in the fan-in cone is then removed from the comprehensive list of nodes 118, resulting in a separate dangling node list 120. The dangling node list 120, accordingly, includes each node outside of logic chains of the terminal output(s) of the digital circuit design 113. Accordingly, alterations to the dangling nodes in the dangling node list 120 do not impact the primary functionality of the digital circuit that is generated based upon the circuit design 113, which in this example is AES encryption. If the circuit design 113 includes a hardware trojan, such as a leakage trojan, the hardware trojan would be enabled via one of these dangling nodes. Therefore, to nullify the potential harmful impact of dangling nodes in the dangling node list 120, the randomizer component 116 randomizes the logic associated with the dangling node in the circuit design 113 (e.g., by randomly altering logic in the fan-out cone of the dangling node and/or randomly altering logic in the logic gate having the dangling node as its output).

The data store 112 includes a list of randomizing options 122, wherein the randomizer component 116 can use randomizing options in the list of randomizing options 122 to alter logic associated with dangling nodes. More specifically, the randomizer component 116 uses the list of randomizing options 122 to change the logic associated with each dangling node in the dangling node list 120 so that any hardware trojan incorporated into the circuit design 113 is thwarted. The list of randomizing options 122 can include logic gate replacement, logic gate addition, logic gate deletion, and/or logic gate inversion. Thus, for each dangling node in the dangling node list 120, the randomizer component 116 alters the circuit design 113 by randomly modifying logic associated with such node (e.g., replacing a logic gate where the node is an input or output with a logic gate of another type, deleting a logic gate where the node is an input or output, adding an inverter on the node, and so forth). Accordingly, the randomizer component 116 modifies the circuit design 113 while leaving the primary function(s) of the circuit design 113 intact, thereby thwarting hardware trojans.

Figure 2:
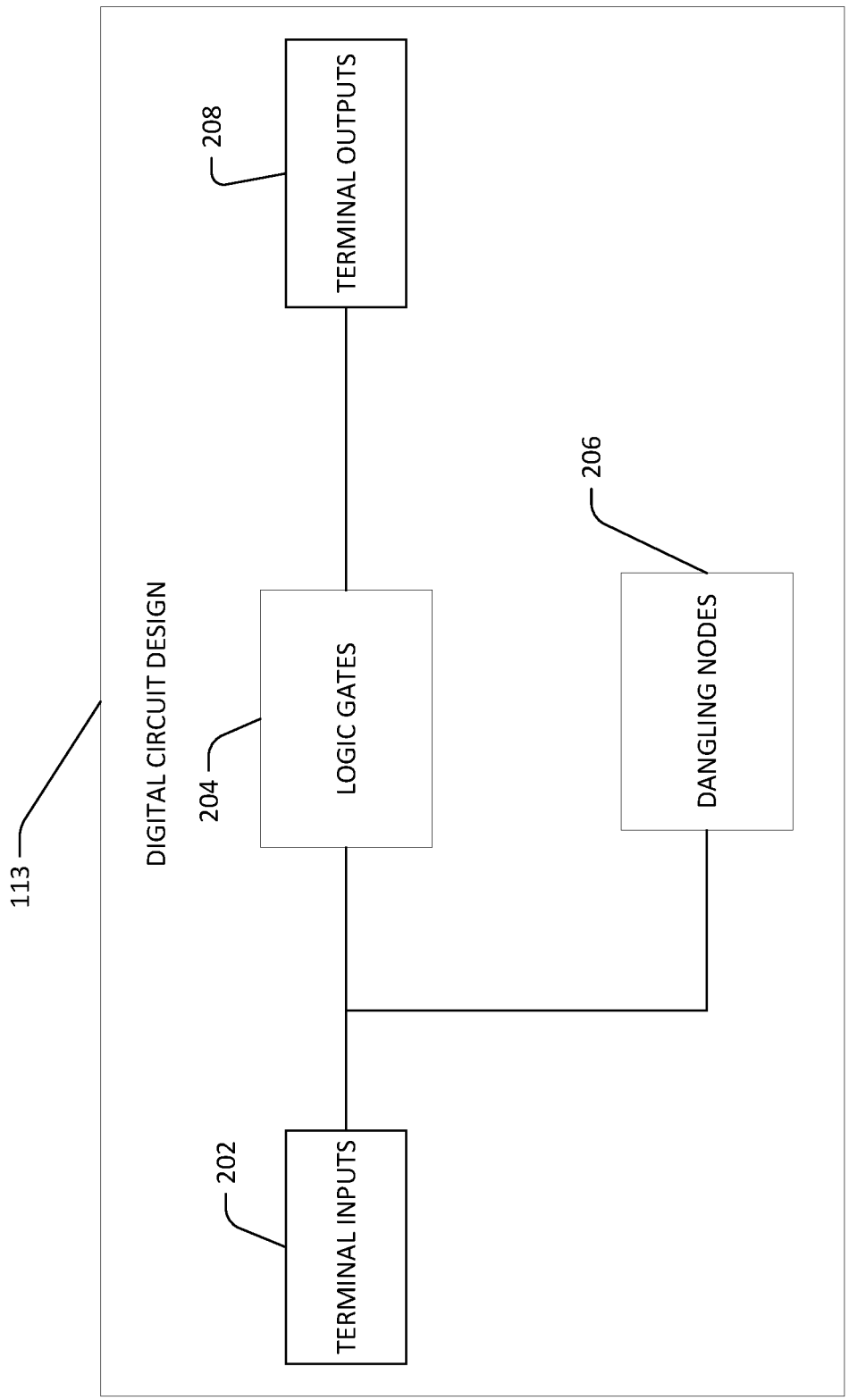
FIG. 2 is a schematic that illustrates a generalized view of a digital circuit design that includes dangling nodes.

Turning briefly to FIG. 2, an exemplary schematic of the circuit design 113 is illustrated. The circuit design 113 comprises terminal input(s) 202, logic gates 204 (and nodes associated therewith), dangling nodes 206, and terminal outputs 208, wherein the logic gates 204 are included in chain(s) of logic between the terminal input(s) 202 and the terminal output(s) 208, and further wherein the dangling nodes 206 lie outside the chain(s) of logic between the terminal input(s) 202 and the terminal output(s) 208. Applying the computing system 100 of FIG. 1 to the exemplary circuit design 113 illustrated in FIG. 2, the node identifier component 114 identifies the fan-in cones of each terminal output in the terminal output(s) 208 within the circuit design 113. Again, the fan-in cone for a terminal output includes the node that represents the terminal output and all nodes and logic gates in logic chain(s) from the terminal output to nodes in the terminal inputs 202. These fan-in cones may be of any depth and are able to cross latch boundaries. As the node identifier component 114 follows the chain of logic from each terminal output 208 back to the terminal inputs 202, it removes any node that it comes across from the comprehensive list of nodes 118 until all that is left from the comprehensive list of nodes 118 is a list of nodes that do not contribute to the terminal outputs 208 (the dangling nodes 206). The list of dangling nodes 120 is then stored in the data store 112.

This process results in the computing system 102 having a list of dangling nodes 122, any number of which dangling nodes 206 could be associated with a hardware trojan, such as the leakage trojan illustrated in FIG. 3, which is designed to extract secret keys from the computing system 102 as described further below.

Figure 3:
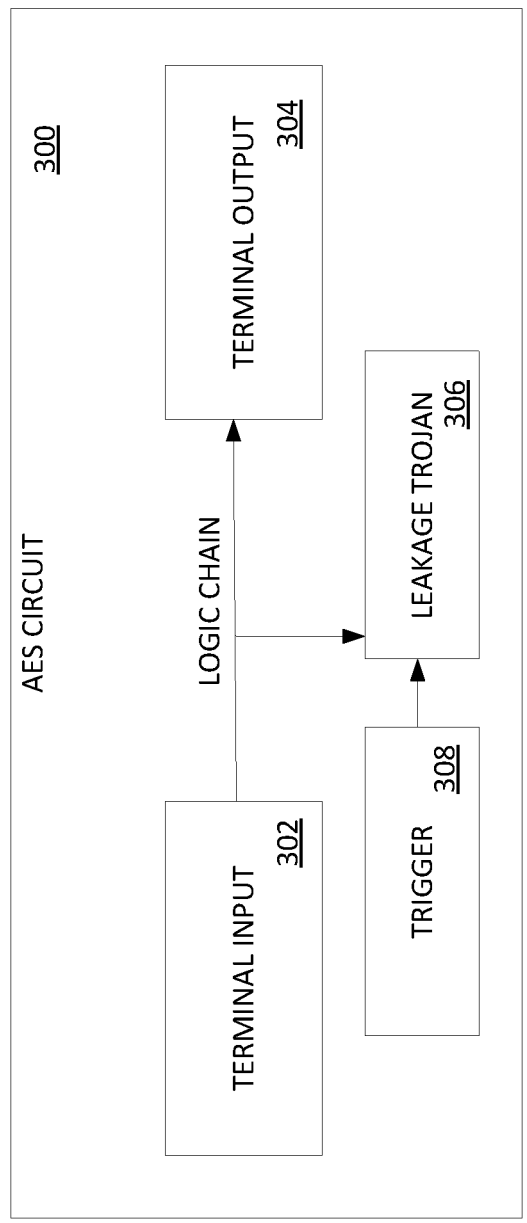
FIG. 3 is a schematic that illustrates a generalized view of a digital circuit design with a leakage trojan.

Referring now to FIG. 3, an exemplary schematic of an AES encryption circuit design 300 with a hardware trojan implemented therein is illustrated, wherein the function of the circuit 300 is to encrypt data. In the exemplary circuit design 300, a leakage trojan 306 has been incorporated therein. The circuit design 300 includes a terminal input 302, which can be a node that carries data that is to be encrypted (e.g., a password, a bank account number, etc.), and a terminal output 304, which carries encrypted data. A circuit generated based upon the circuit design 300 can operate as intended—that is, the circuit encrypts data. A malicious entity, however, can trigger the leakage trojan 306. In an example, the leakage trojan 306 can be configured to cause unencrypted data to be stored in a register, which can be read out by the malicious entity. Pursuant to an example, the leakage trojan 306 can be activated based upon a trigger 308. As noted above, however, neither the trigger 308 nor the leakage trojan 306 impacts the terminal output 304; thus, an end user has no way of knowing his information is being stolen or otherwise accessed without his consent.

In an example, the trigger 308 can be configured to be activated based upon a comparison between plaintext and a key, which can be entered at any time by the malicious entity. When the key is provided to the trigger 308, the trigger 308 performs a function that causes the leakage trojan 306 to become active, thereby allowing unauthorized access to the information passing through the AES circuit. In an example, the leakage trojan 306 comprises a shift register loaded with the AES secret key. When the trigger 308 is activated, the bitstream is shifted right in the shift register by one bit every 128 clock cycles. The least significant bit of the shift register is associated with a logic circuit that consumes power as a function of the least significant bit, and when the malicious entity monitors the power consumption, he can discern the AES secret key, thereby allowing unfettered access to the encrypted information. The computing system 100 prevents this attack from occurring by randomizing logic associated with each dangling node, which are where hardware trojans such as the leakage trojan 306 would be implemented.

Figure 4:
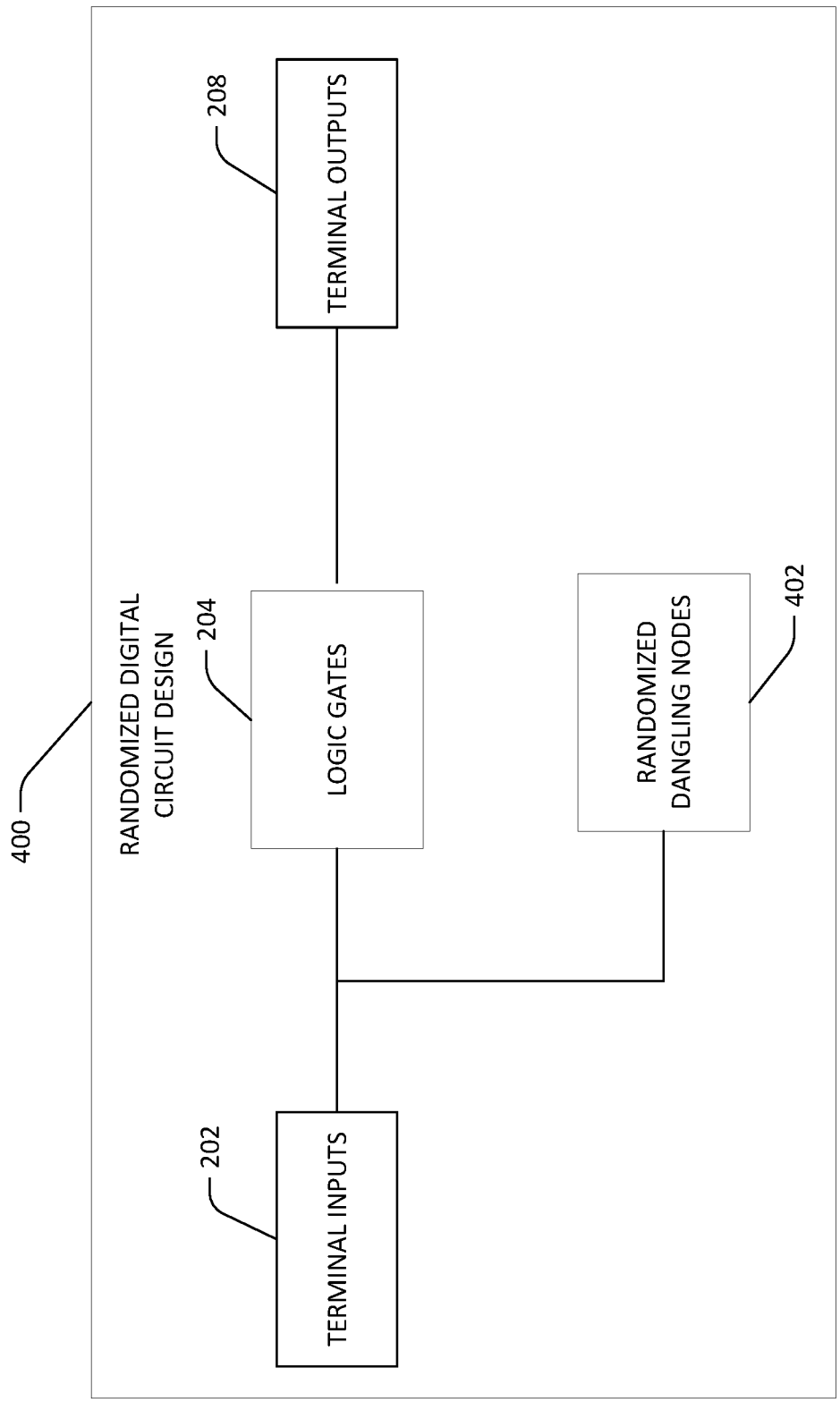
FIG. 4 is a schematic that illustrates a generalized view of a digital circuit design that includes dangling nodes with logic that has been randomized.

Referring now to FIG. 4, an exemplary schematic of a circuit design 400 is depicted, wherein the circuit design 400 is a modification of the circuit design 113 shown in FIG. 2. Returning briefly to FIG. 1, the randomizer component 116 uses the list of dangling nodes 120 to identify which nodes to target for randomization. In an example, a targeted dangling node would be included in the dangling nodes 206 as shown in FIG. 2. The logic gates 204 (and nodes that are inputs and outputs to such gates 204) would not be targeted for modification, as randomization of nodes at inputs or outputs of such logic gates would alter the terminal output 208, thereby altering the intended functionality of the circuit generated based upon the circuit design 113. The randomizer component 116, as described above, modifies the circuit design 113 by randomizing logic associated with the dangling node (e.g., in the fan-out cone of the dangling node and/or the logic gate where the dangling node is its output).

After the randomizer component 116 has randomized logic associated with each dangling node 206 within the digital circuit design 200 that was identified in the list of dangling nodes 122, the result is the circuit design 400, which has the terminal inputs 202, logic gates 204 (and associated nodes), and terminal outputs 208, but the dangling nodes 206 have been altered such that they have been transformed into randomized dangling nodes 402. Because the randomized dangling nodes 402 are located outside the logic chain between the terminal inputs 202 and the terminal outputs 208, the randomization of the dangling nodes 206 resulting in the randomized dangling nodes 402 does not alter the intended functionality of the original circuit design. So, to the user, the act of randomizing the dangling nodes 206 has no impact on his use of the client computing device 104.

Figures 5A, 5B:
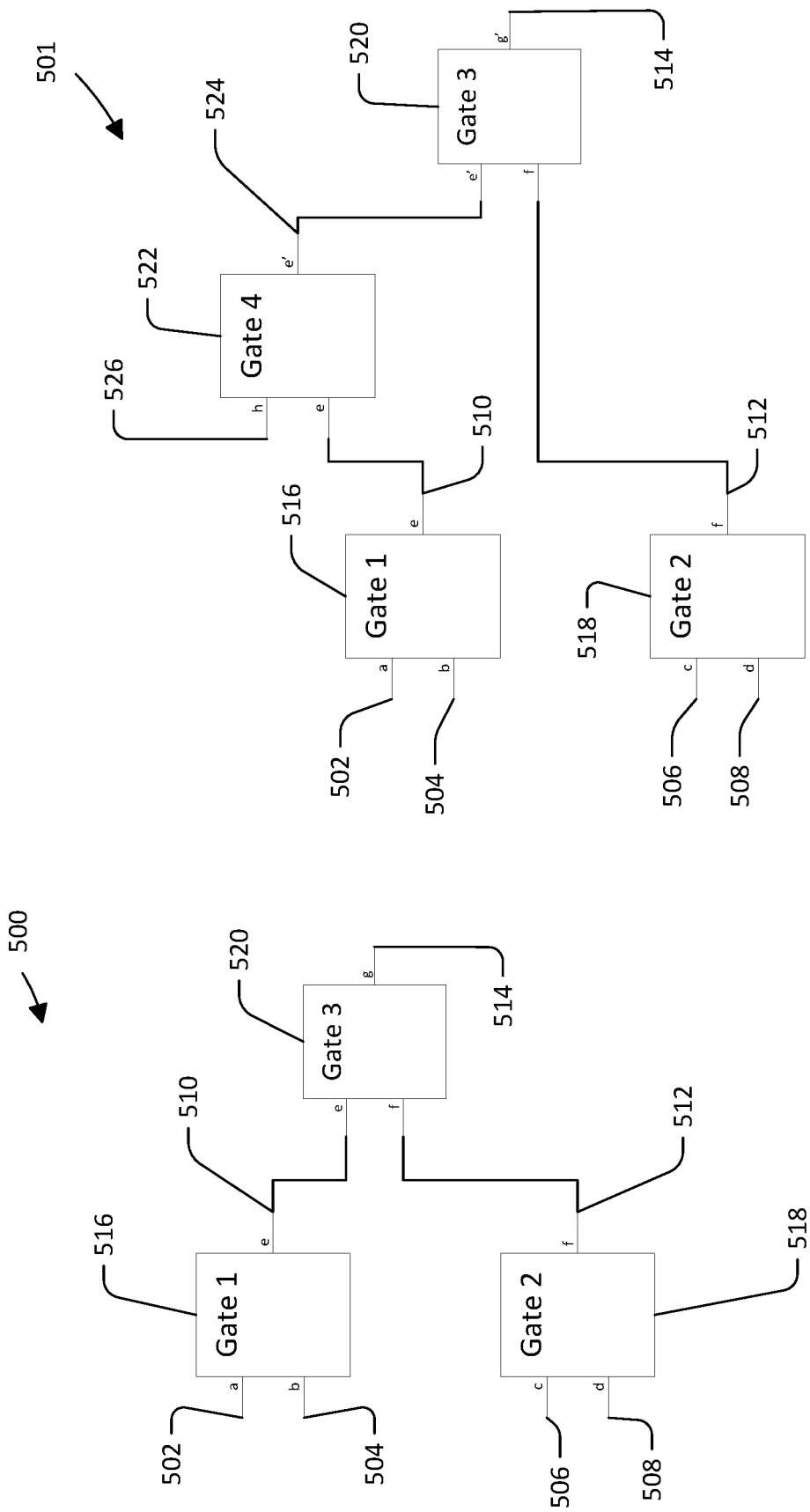
FIG. 5A is a schematic that illustrates a sub-circuit that includes dangling nodes.
FIG. 5B is a schematic that illustrates randomization of logic associated with a dangling node via logic gate addition.

Referring now to FIG. 5A, an exemplary schematic 500 illustrating randomization of logic associated with a dangling node by the randomizer component 116 is illustrated, wherein the randomizer component 116 randomizes the logic by adding a logic gate to the fan-out cone of the dangling node. In an example, the dangling nodes 206 comprise seven dangling nodes 502-514, which are inputs and/or outputs of three logic gates: Gate 1 516, Gate 2 518, and Gate 3 520. As described previously, the randomizer component 116 can randomize logic associated with each of the dangling nodes 502-514—for purposes of explanation, FIG. 5 illustrates logic associated with the dangling node 510 being randomized. Again, however, it is to be understood that the randomizer component 116 can randomize logic associated with each of the dangling nodes 502-514. In an example, the randomizer component 116 can randomize the logic associated with the dangling node 510 by adding a new (randomly selected) logic gate to the fan-out cone of the dangling node 510.

Now referring to FIG. 5B, a schematic 501 depicting the result of the logic associated with the dangling node 510 being randomized by the randomizer component 116 is illustrated. The randomizer component 116 has added a logic gate (Gate 4 522) of a randomly selected type at the dangling node 510, resulting in creation of new nodes 524 (where the node 524 is at the output of the gate 522 and the node 526 is at the input of the gate 522). Accordingly, as the gate 522 has been added in the logic chain, the output at the node 514 may be altered, thereby preventing a malicious entity from understanding the output at the node 514. It is again emphasized that the randomizer component 116 can perform a randomization action with respect to each dangling node 510-514, wherein the randomizer component 116 can randomly select the type of randomization action to perform as well as randomly select a type of gate to be included in the circuit design.

Figure 5C:
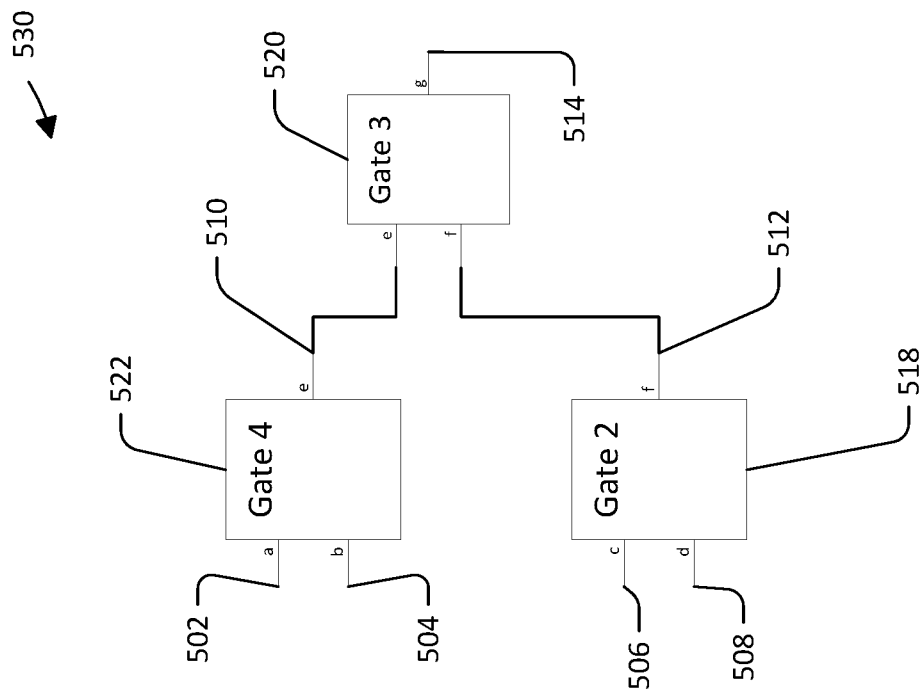
FIG. 5C is a schematic that illustrates randomization of logic associated with a dangling node via logic gate replacement.

Referring now to FIG. 5C, an exemplary schematic 530 depicting another act of randomization that can be performed by the randomizer component 116 with respect to the dangling node 510 is illustrated. As shown, the act of randomization can include replacement of the gate 516 (which is of a first type) with the gate 522 (which is of a second type). The randomizer component 116 has thus altered the circuit design 113, such that logic associated with dangling nodes have been subject to randomization, thereby preventing a circuit manufactured based upon the circuit design 113 from including a workable hardware trojan. Specifically, replacing the gate 516 with the gate 522 impacts the output of the gate 520. As can be ascertained, performing randomization acts with respect to all of the dangling nodes 502-514 can make understanding the output to be extremely difficult if not impossible.

Figure 6A:
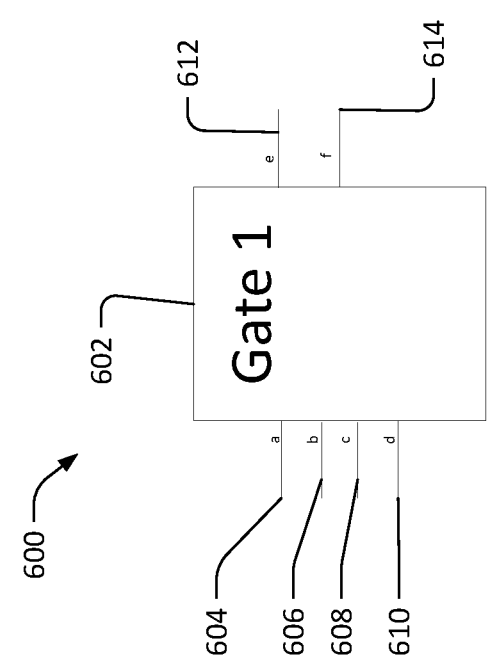
FIG. 6A is a schematic that illustrates an exemplary logic gate in a circuit, wherein a dangling node extends from the logic gate.
Figure 6B:
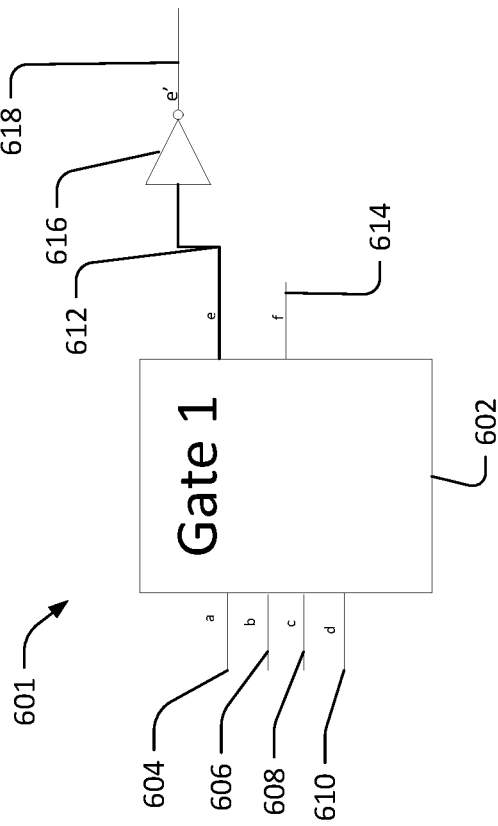
FIG. 6B is a schematic that illustrates randomization of logic associated with a dangling node via addition of an inverter in a fan-out cone of the dangling node.

Referring now to FIG. 6A, a schematic 600 of an exemplary logic gate 602 that has several dangling nodes 604-612 included in the dangling nodes 206 is illustrated. The logic gate 602 has two dangling nodes 612 and 614 exiting therefrom. Referring to FIG. 6B, a schematic 601 of the exemplary logic gate 602 is depicted after the randomizer component 116 has randomized logic associated with the dangling node 612. In the example shown in FIGS. 6A and 6B, the randomizer component 116 has placed an inverter 616 at the node 612, thereby inverting one of the outputs of the logic gate 602. While not shown, for example, the randomizer component 116 may add a (randomly selected) logic gate to the circuit such that the node 614 is input to the newly added and randomly selected logic gate. Since the nodes 612 and 614 are dangling nodes, the primary function of the circuit is unaffected.

Figure 7:
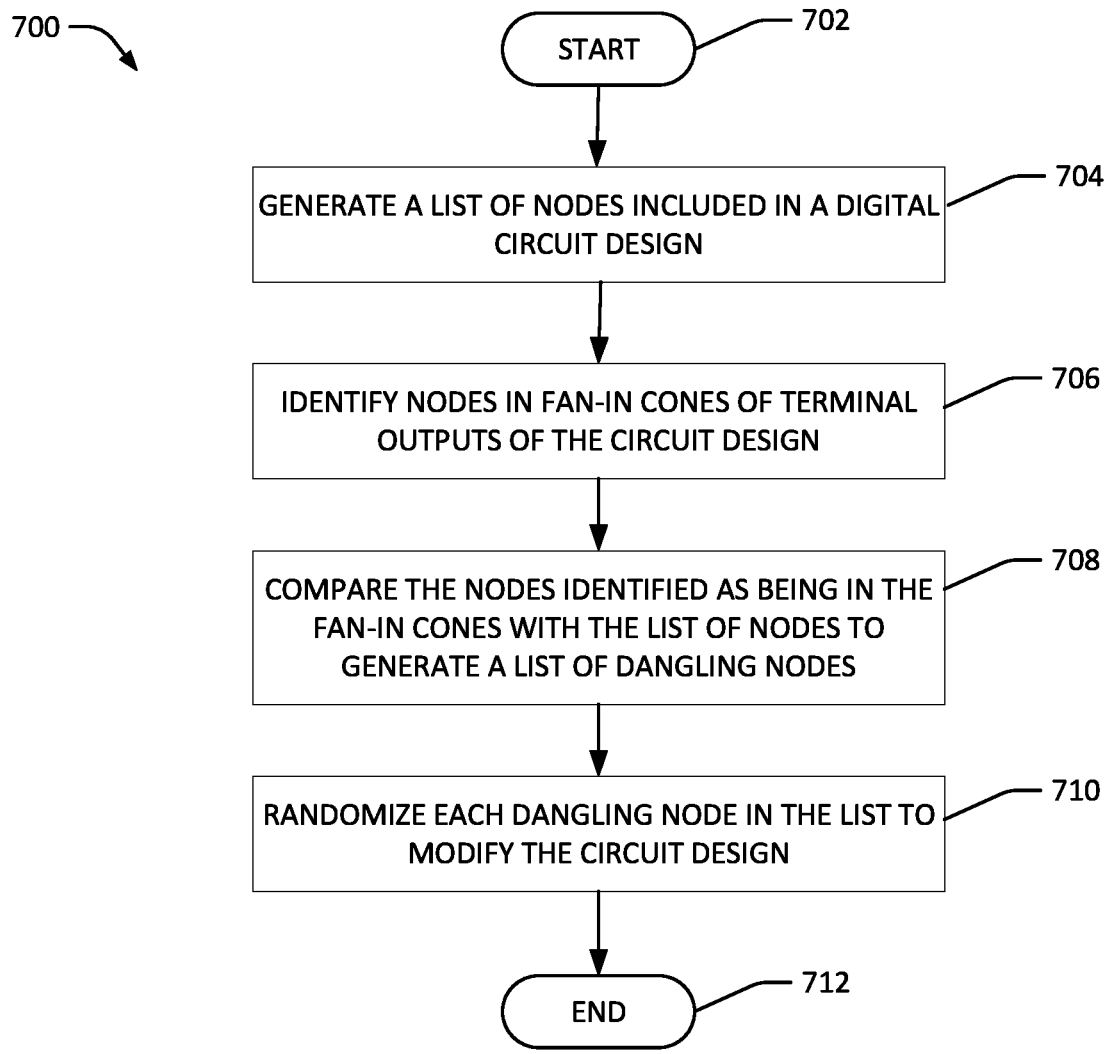
FIG. 7 illustrates an exemplary methodology relating to identifying and randomizing logic associated with dangling nodes within a digital circuit design.

FIG. 7 illustrates an exemplary methodology 700 relating to identifying and randomizing dangling nodes within a digital circuit design. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

The methodology 700 starts at 702, and at 704 all nodes within a digital circuit design are identified and compiled into a list (whether they are dangling nodes or nodes that feed into the terminal output).

At 706, during a further identification period, nodes belonging to fan-in cones of each terminal output of the circuit design are identified. In an alternative approach, nodes belonging to fan-out cones that do not include a terminal output are identified. Identifying nodes belonging to the fan-in cones comprises following the logic chains from the terminal outputs to the terminal inputs, where each node in the logic chains is included in a fan-in cone of at least one terminal output.

At 708, the nodes identified as belonging to fan-in cones of the terminal outputs are compared to the list generated at 704, and a list of dangling nodes is generated based upon such comparison. The list of dangling nodes includes nodes from the list generated at 704 that were not identified as belonging to a fan-in cone of a terminal output in the circuit design.

At 710, each dangling node identified at 708 is randomized. This can be done by: replacing a logic gate having the dangling node as an output with another logic gate; adding a logic gate such that the dangling node is an input to the newly added logic gate; inverting the dangling node; removing the logic gate that has the dangling node as an output, etc. After the circuit design has been modified to include the randomized nodes, a circuit can be generated based upon the modified circuit design. The methodology 700 completes at 712.

Figure 8:
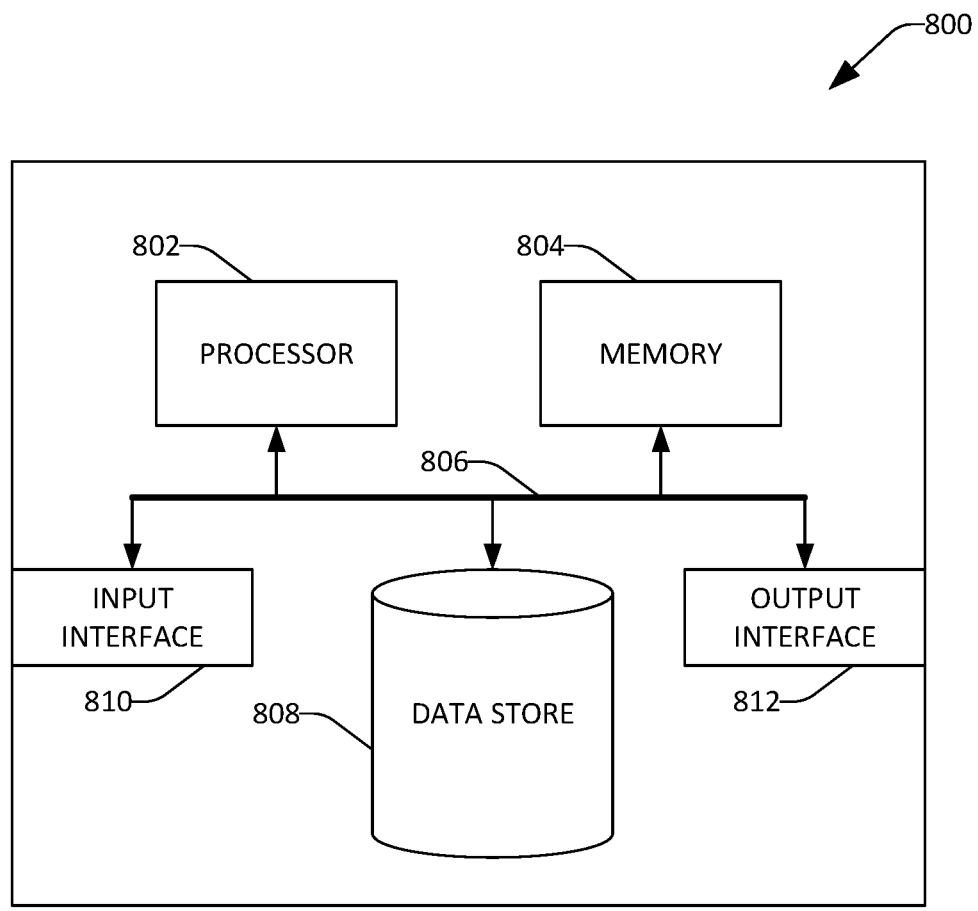
FIG. 8 is an exemplary computing system.

Referring now to FIG. 8, a high-level illustration of an exemplary computing device 800 that can be used in accordance with the systems and methodologies disclosed herein is illustrated. For instance, the computing device 800 may be used in a system that identifies nodes in fan-in cones of a terminal output node of a digital circuit design. By way of another example, the computing device 800 can be used in a system that is configured to randomize nodes in a digital circuit design. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store circuit designs, a list of dangling nodes, etc.

The computing device 800 additionally includes a data store 808 that is accessible by the processor 802 by way of the system bus 806. The data store 808 may include executable instructions, a circuit design, a list of nodes in the circuit design, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that is configured to modify nodes in a digital circuit design, the system comprising:
   a processor; and
   memory that stores instructions that, when executed by the processor, cause the processor to perform acts comprising:
      identifying, within the digital circuit design, a dangling node that fails to impact a function of the digital circuit design from one or more terminal inputs to one or more terminal outputs, each of the one or more terminal inputs corresponding to one of a primary input of the digital circuit design and an output from a memory in the digital circuit design, each of the one or more terminal outputs corresponding to one of a primary output of the digital circuit design and an input into the memory in the digital circuit design; and
      responsive to identifying the dangling node within the digital circuit design, randomly modifying circuit logic associated with the dangling node.

2. The system of claim 1, wherein identifying the dangling node comprises:
   compiling a list of all nodes within the digital circuit design;
   within the list of all nodes, identifying all nodes in the digital circuit design that impact the function of the digital circuit design from one or more terminal inputs to one or more terminal outputs; and
   removing the identified nodes that impact the function of the digital circuit design from the list of all nodes to create a list of dangling nodes, wherein the dangling node is included in the list of dangling nodes.

3. The system of claim 1, wherein randomly modifying the circuit logic associated with the dangling node comprises adding at least one logic gate to a fan-out cone of the dangling node.

4. The system of claim 1, wherein randomly modifying the circuit logic associated with the dangling node comprises replacing a logic gate with a second logic gate, wherein the logic gate and the second logic gate are of different types.

5. The system of claim 1, wherein randomly modifying the circuit logic associated with the dangling node comprises inverting the dangling node.

6. The system of claim 1, wherein randomly modifying the circuit logic associated with the dangling node comprises deleting a logic gate in a fan-out cone of the dangling node.

7. The system of claim 1, wherein randomly modifying the circuit logic associated with the dangling node comprises modifying the circuit logic in a fan-out cone of the dangling node.

8. A method executed by a processor of a computing system, the method comprising:
   identifying, within a digital circuit design, a dangling node that fails to impact a function of a circuit from one or more terminal inputs to one or more terminal outputs, each of the one or more terminal inputs corresponding to one of a primary input of the circuit and an output from a memory in the circuit, each of the one or more terminal outputs corresponding to one of a primary output of the circuit and an input into the memory in the circuit, the circuit being based upon the digital circuit design, wherein the dangling node is an input to a logic gate in the digital circuit design; and
   randomly modifying the digital circuit design responsive to identifying the dangling node, wherein randomly modifying the digital circuit design comprises randomly modifying logic associated with the identified dangling node using one of a plurality of modification methods, wherein randomly modifying the digital circuit design fails to impact the function of the circuit, and wherein the circuit is adapted to be manufactured based upon the randomly modified digital circuit design.

9. The method of claim 8, wherein identifying the dangling node comprises:
   compiling a list of all nodes within the digital circuit design;
   within the list of all nodes, identifying all nodes in the digital circuit design that impact the function of the circuit from one or more terminal inputs to one or more terminal outputs; and
   removing the identified nodes that impact the function of the circuit from the list of all nodes to create a list of dangling nodes, wherein the dangling node is included in the list of dangling nodes.

10. The method of claim 8, wherein randomly modifying the logic associated with the identified dangling node comprises adding a logic gate in a fan-out cone of the identified dangling node.

11. The method of claim 8, wherein randomly modifying the logic associated with the identified dangling node comprises replacing the logic gate with a second logic gate, wherein the logic gate and the second logic gate are of different types.

12. The method of claim 8, wherein randomly modifying the logic associated with the identified dangling node comprises inverting the identified dangling node at the input to the logic gate.

13. The method of claim 8, wherein randomly modifying the logic associated with the identified dangling node comprises removing the logic gate from the digital circuit design.

14. A computer-readable storage medium comprising instructions that, when executed by a processor, cause the processor to perform acts comprising:
   identifying, within a digital circuit design, a dangling node that fails to impact a function of a circuit from one or more terminal inputs to one or more terminal outputs, each of the one or more terminal inputs corresponding to one of a primary input of the circuit and an output from a memory in the circuit, each of the one or more terminal outputs corresponding to one of a primary output of the circuit and an input into the memory in the circuit, the circuit being based upon the digital circuit design, wherein the dangling node is an input to a logic gate in the digital circuit design; and randomly modifying the digital circuit design responsive to identifying the dangling node, wherein randomly modifying the digital circuit design comprises randomly modifying logic associated with the identified dangling node using one of a plurality of modification methods, wherein randomly modifying the digital circuit design fails to impact the function of the circuit, and wherein the circuit is adapted to be manufactured based upon the randomly modified digital circuit design.

15. The computer-readable storage medium of claim 14, wherein identifying the dangling node that fails to impact the desired output of the circuit comprises:

compiling a list of all nodes within the digital circuit design;

within the list of all nodes, identifying all nodes in the digital circuit design that impact the function of the circuit from one or more terminal inputs to one or more terminal outputs; and removing the identified nodes that impact the function of the circuit from the list of all nodes to create a list of dangling nodes, wherein the dangling node is included in the list of dangling nodes.

16. The computer-readable storage medium of claim 14, wherein randomly modifying the logic associated with the identified dangling node comprises adding a logic gate in a fan-out cone of the identified dangling node.

17. The computer-readable storage medium of claim 14, wherein randomly modifying the logic associated with the identified dangling node comprises replacing the logic gate with a second logic gate, wherein the logic gate and the second logic gate are of different types.

18. The computer-readable storage medium of claim 14, wherein randomly modifying the logic associated with the identified dangling node comprises inverting the identified dangling node at the input to the logic gate.

19. The computer-readable storage medium of claim 14, wherein randomly modifying the logic associated with the identified dangling node comprises removing the logic gate from the digital circuit design.

* * * * *